(12) United States Patent
Udeshi et al.

(10) Patent No.: US 8,818,329 B2
(45) Date of Patent: Aug. 26, 2014

(54) SYSTEM AND METHOD FOR CAPTURING NETWORK USAGE DATA

(75) Inventors: Dharmen Udeshi, Fairfax, VA (US); Vijay Venkateswaran, Fairfax, VA (US); Michael Charles Roudi, Plano, TX (US)

(73) Assignee: Time Warner Cable Enterprises LLC, New York, NY (US)

( * ) Notice: Subject to any disclaimer, the term of this patent is extended or adjusted under 35 U.S.C. 154(b) by 112 days.

(21) Appl. No.: 13/539,014

(22) Filed: Jun. 29, 2012

(65) Prior Publication Data

US 2014/0004816 A1 Jan. 2, 2014

(51) Int. Cl.
*H04M 11/00* (2006.01)
*H04W 24/00* (2009.01)

(52) U.S. Cl.
USPC ......... 455/406; 455/414.1; 455/423; 370/328

(58) Field of Classification Search
USPC .............. 455/405, 406, 414.1, 407, 408, 423; 370/328; 705/30, 7.37; 726/7
See application file for complete search history.

(56) References Cited

U.S. PATENT DOCUMENTS

| 2002/0069037 A1* | 6/2002 | Hendrickson et al. ........ 702/186 |
| 2006/0080493 A1* | 4/2006 | Leon et al. ........................ 711/4 |
| 2009/0138325 A1* | 5/2009 | Britt et al. ....................... 705/10 |
| 2010/0041391 A1* | 2/2010 | Spivey et al. ................. 455/425 |

* cited by examiner

*Primary Examiner* — Daniel Lai
(74) *Attorney, Agent, or Firm* — The Marbury Law Group, PLLC (57) ABSTRACT

A system and method for anonymously capturing network usage data from a mobile device. A first host device includes a first processor coupled to a first memory and a first datastore. A second host device includes a second processor coupled to a second memory and second and third datastores. The first host device receives personal identifying information and demographic information of a user and stores them in association with a unique identifier. The second datastore stores the demographic information of the user received from the first datastore and a mobile device identifier of the mobile device in association with the unique identifier. The device identifier is double hashed to create an obfuscated double hash identifier (ODHID). The third datastore receives mobile device and device identifier data and stores the data and the demographic information in a folder associated with the ODHID.

34 Claims, 6 Drawing Sheets

SYSTEM AND METHOD FOR CAPTURING NETWORK USAGE DATA

BACKGROUND

Mobile devices obtain power from a battery pack that may be recharged. The power from the battery pack is primarily consumed when the processor, memory and the display are engaged in operations commanded by one or more applications. Some applications may also engage additional hardware systems such as color displays, audio systems, Wi-Fi transceivers, wireless service transceivers and GPS receivers. The power drain on the battery pack depends on what applications and systems are operating and for how long.

Applications (or "apps") vary in terms of their power demands and their importance. For example, the operating system of a mobile device may generally be perceived to be more important than a video game application by a user in one demographic group but not in another. An application that collects data for the benefit of a service provider may not be perceived by the user of the mobile device as having priority over any other application.

Memory is another limited resource on a mobile device. Apps that utilize runtime memory may operate myopically without awareness of the needs and demands of other apps. As runtime memory usage approaches a threshold limit, performance of the mobile device may be degraded. Different users may have different perceptions about which applications have priority over other applications. For example, a person who texts and plays interactive games may not perceive value in a calendar application. An application that collects data for the benefit of a service provider may not be perceived by the user of the mobile device as having priority over any other application.

Memory and battery monitoring is largely a user task. Devices may be able to warn a user when memory or battery levels are low but are not able to take action to forestall consequences from a loss of power or an overtaxed memory.

Battery and memory management may be particularly important when the user is asked to allow an application to operate on the mobile device for the benefit of a third party. For example, a third party may ask to operate an application that collects data. Wireless network planning is a difficult task that is often made more challenging by a lack of actual network and usage data. Current mobile devices such as smartphones, tablets and laptops are able to use Wi-Fi and wireless services (3G and 4G) simultaneously or in the alternative. It would be beneficial for a provider of both wireless and Wi-Fi services to know how potential users are likely to use the service offerings of the service provider before resources are committed to a particular network architecture.

Data from which such potential usage might be determined are difficult to obtain. Users of mobile devices may object to monitoring their usage habits on privacy grounds. Additionally, even if the privacy concerns may be overcome, users may be disinclined to consent to monitoring if the monitoring activity interferes with usage of the mobile device.

SUMMARY

Embodiments are directed to the collection of usage data from a sample of subscribers while minimizing the impact of the data collection activity on the operation of the mobile device from which the data are collected.

Embodiments are also directed to the management of power demands among competing apps, including monitoring applications.

Other embodiments are directed to the management of the performance of the mobile device in light of the demand among competing apps, including monitoring applications, for memory.

DETAILED DESCRIPTION

In an embodiment, a mobile device operates a mobile monitoring application. The mobile monitoring application may be pre-loaded on the mobile device or it may be a download accessible to a user of the device. In the latter case, the mobile device registers with a download server to obtain the mobile monitoring application. In either embodiment, the mobile device interacts with a remote server to provide additional information about the mobile device and the user of the device, and is configured with the mobile monitoring application to collect and report specific data relating to the 3G, 4G, WiFi and Bluetooth network use. These data may include time, date and location information relating to a particular usage event and information that identifies the network being used. In an embodiment, a management application minimizes the impact of the data monitoring application on the performance of the mobile device.

Figure 1:
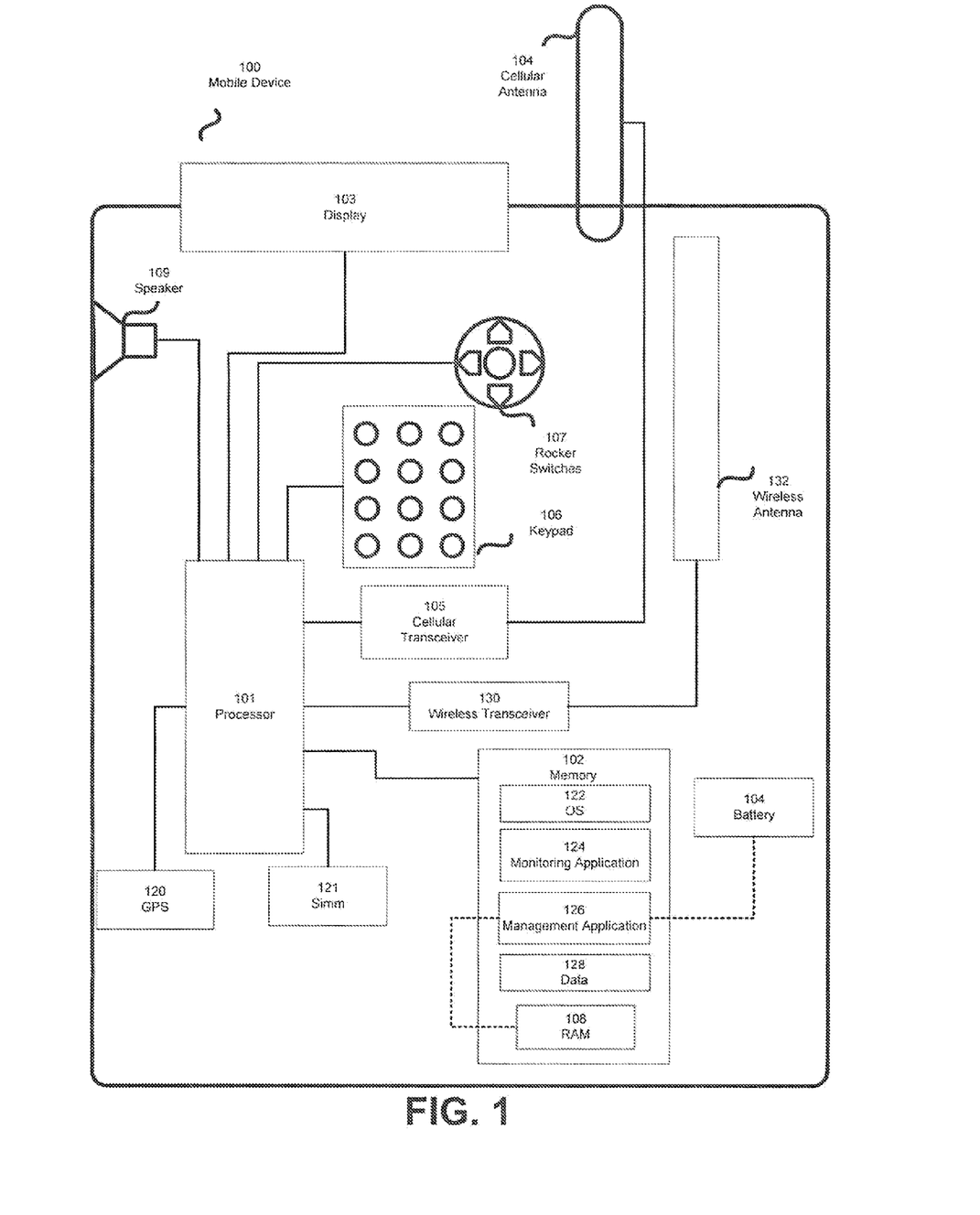
FIG. 1 is a block diagram illustrating a mobile device configured with a monitoring application according to an embodiment.

FIG. 1 is a block diagram illustrating a mobile device configured with a monitoring application according to an embodiment.

A mobile device 100 may include a processor 101 coupled to an internal memory 102, to a display screen 103 and to a SIMM 121 or similar removable memory unit. Additionally, the mobile device 100 may optionally have a cellular antenna 104 for sending and receiving electromagnetic radiation that is connected to a cellular transceiver 105 coupled to the processor 101. In some implementations, the transceiver 105 and portions of the processor 101 and memory 102 may be used for multi-network communications. The mobile device 100 may also include a key pad 106 or miniature keyboard and menu selection buttons or rocker switches 107 for receiving user inputs. The mobile device 100 may also include a GPS navigation device 120 coupled to the processor and used to determine the location coordinates of the mobile device 100. Additionally, the display 103 may be a touch-sensitive device that may be configured to receive user inputs.

A wireless transceiver 130 provides wireless communications via wireless antenna 132. By way of illustration and not by way of limitation, the wireless transceiver may be compliant with 802.11x standards.

The processor 101 may be any programmable microprocessor, microcomputer or multiple processor chip or chips that can be configured by software instructions (applications) to perform a variety of functions, including the functions of the various embodiments described herein. In an embodiment, the mobile device 100 may include multiple processors 101, such as one processor dedicated to cellular and/or wireless communication functions and one processor dedicated to running other applications.

Typically, software applications may be stored in the internal memory 102 before they are accessed and loaded into the processor 101. For example, the internal memory 102 may include monitoring application 124 and a systems management application 126. The memory may also include an operating system 122. The memory 102 may provide storage for data that is generated by the systems operating on the mobile device 100 and/or by the applications and operating system.

In an embodiment, the processor 101 may include or have access to the internal memory 102 sufficient to store the application software instructions.

The internal memory of the processor may include a secure memory (not illustrated) which is not directly accessible by users or applications and that is capable of recording MDINs and SIMM IDs as described in the various embodiments. As part of the processor, such a secure memory may not be replaced or accessed without damaging or replacing the processor.

Additionally, the internal memory 102 may be a volatile or nonvolatile memory, such as flash memory, or a mixture of both. For example, the internal memory 102 may include random access memory (RAM) 108 for storing runtime software instructions. For the purposes of this description, a general reference to memory refers to all memory accessible by the processor 101, including internal memory 102, removable memory plugged into the computing device, and memory within the processor 101 itself, including the secure memory.

In an embodiment, additional memory chips (e.g., a Secure Data (SD) card) may be plugged into the mobile device 100 and coupled to the processor 101.

The monitoring application 124 may capture various data points relevant to the operation of the mobile device 100 and store them in space allocated for data (Block 128) of the memory 102. By way of illustration and not by way of limitation, the monitoring application may track device parameters, network data parameters and location parameters.

Device parameters may include the operating system of the device, the date and time of a monitored event, an IP address of the device, a device identifier, a status of the device, and an event identifier. An event may include activation/deactivation of a Bluetooth transceiver, activation/deactivation of a Wi-Fi transceiver, activation/deactivation of a GPS receiver, a switch from a Wi-Fi connection to a cellular connection, an application call, access to a web page, a power on, a power off, a telephone call made, and a telephone call received.

Network parameters may include network quality, network type, data consumed/session time and application type.

Location parameters may include GPS data, a base station identifier, and a sector identifier.

Figure 5:
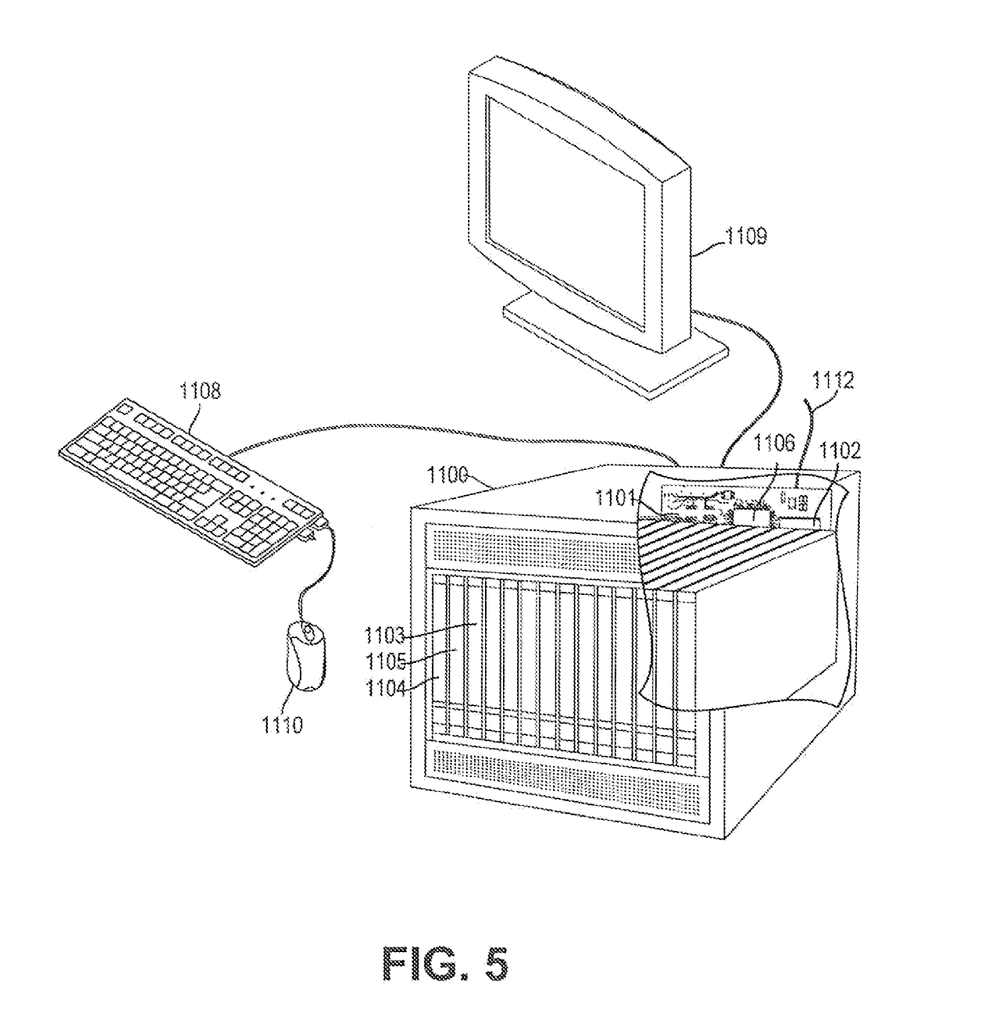
FIG. 5 is a block diagram of a computing device suitable for use with any of the embodiments.

The monitoring application 124 may also operate to report the collected data to a data receiving device (not illustrated), such as a server connected to a network. The functional elements of a server capable of receiving the collected data and processing the collected data are illustrated in FIG. 5.

The monitoring application 124 may also interact with a systems management application 126. In an embodiment, the systems management application 126 coordinates the collection and reporting of data to minimize the impact of the monitoring activities on the behavior of the mobile device 100. For example, reporting of the collected data to a data receiving device requires the use of either wireless transceiver 130 or cellular transceiver 105. The systems management application 126 may determine when a network is available to receive the collected data, which network is the most power efficient to use, whether the battery has sufficient power to send the collected data and whether the battery will have a minimum amount of power remaining after the collected data has been sent. Power management operations may be configurable (through a graphical user interface supported by the systems management application 126) to set priorities among applications and functions of the mobile device.

The systems management application 126 may also be configured to manage the memory 102 that is allocated to the data storage (Block 128) and the portion of RAM 108 that is allocated to the runtime of the monitoring application 124. For example, the systems management application 126 may regulate a polling function of the monitoring application 124 to reduce the amount of collected data that is stored in memory 102. The systems management application 126 may coordinate the collection of data by the monitoring application 124 with the availability of data transmission resources to reduce the time that collected data resides in the data storage (Block 128) of the memory 102. The systems management application 126 may also determine that closing the monitoring application 124 and reallocating the portion of RAM 108 that is allocated to it may be necessary to insure that the performance of the mobile device is acceptable to the user.

As described above, the monitoring application 124 may be configured to acquire location parameters. The location of the mobile device 100 may be expressed as a point having a measurement error (coordinates plus or minus X meters) or it may be expressed as probability. The measurement error or the probability may be considered a measure of the accuracy of the location parameters. In an embodiment, the systems management application 126 evaluates the accuracy of location information that is obtained from the operation of the cellular transceiver 105 and/or the wireless transceiver 130. When the accuracy is acceptable, then the location data from these sources is reported. When the accuracy is not acceptable, then the GPS radio 120 may be used to acquire more accurate location parameters. By selectively using the GPS radio 120, the systems management application 126 reduces the power demand attributable to the monitoring application 124.

A simple model for the anonymous collection of data provides the collected data in association with a unique identifier. For example, a mobile device may be identified in a data structure by a device identifier. The device identifier may be used to seed a hashing function. The hashed value may be used to associate the collected data with an anonymous device. For example, data from the mobile device and the device ID may arrive at a first data structure. The first data structure may create a hash of the device ID and send the data and the hash to a second data structure for collecting an analysis.

While this approach may provide anonymity for the user, the value of the collected data can be improved by also collecting demographic information about the user. In order to assure that collected data can be associated with a user's demographic information but not associated with the user's personal information, a registration process may be used in which the user's personal identifying information is collected by a participation management host (PMH) and stored such that it is not accessible to a data collection host (DCH).

Figure 2:
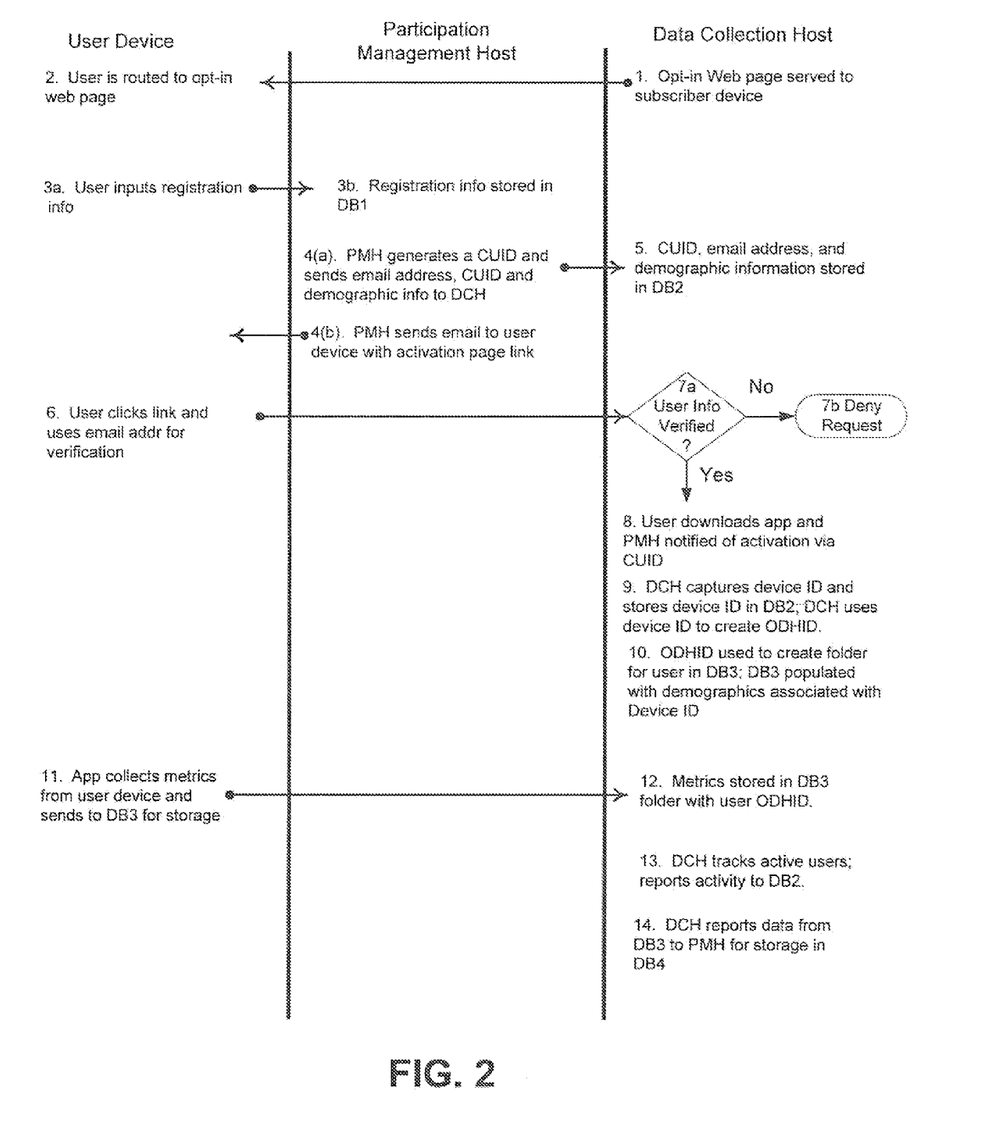
FIG. 2 is a flow diagram illustrating a process flow for registering a user as a participant in a monitoring campaign for a mobile device according to an embodiment.

FIG. 2 is a flow diagram illustrating a process flow for registering a user as a participant in a monitoring campaign for a mobile device according to an embodiment. As illustrated in FIG. 2, there are three functionally distinct participants in the process—a user, the PMH, and the DCH.

A user of a mobile device, such as mobile device 100 illustrated in FIG. 1, who is interested in participating in a data collection campaign is served an opt-in web page by a DCH (1). The mobile device accesses the opt-in web page (2). The web page may provide information about the data to be collected, the use of the data, and how the privacy of the data will be maintained. The user of the mobile device may be offered incentives for participating.

If the user opts in, the user provides information required for participation (3a). For example, the user may be asked to provide demographic information and personal identifying information, which includes the user's email address. The registration information may be evaluated to determine if the user and/or the user's mobile device qualify for participation in the data collection campaign. For example, a user may have to be a certain age or the mobile device of the user may have to be of a certain type.

The provided information is sent to the PMH where it is stored in a first database (DB1) that is accessible to the PMH (3b) along with a customer unique identifier (CUID) that is generated by the PMH. The CUID generated by the PMH is distinct from the personal identifying information provided by the user during registration. The email address, the CUID, and the demographic information are sent to the DCH (4a). In an embodiment, personal identifying information such as the user's first and last names, phone number and mailing address are not sent. The PMH sends an acknowledgement message to the user device, which message includes an activation page link (4b). The email address, the CUID, and the demographic information are stored in a second database (DB2) accessible to the DCH (5).

The user clicks on the link (6) and sends a download request to the DCH. The download request includes the user's email address as provided during registration. The link provides the user with access to an application, such as the monitoring application 124. A determination is made whether the email address submitted by the user matches the information provided during registration (7a). If the result of block 7a is "NO," the download of the application is denied (7b). In an embodiment, the DCH may send the user device a message indicating that the information submitted with the download request does not match the information provided during registration and inviting the user to resubmit the download request. If the result of block 7a is "YES," the application is made available to the user device for download.

The application is downloaded to the mobile device and is executed (8). The DCH captures the device ID and stores the device ID in DB2 (9). The DCH double hashes the device ID to create an obfuscated double hash identifier (ODHID) (9). The hashing of the device ID is a one-way process and precludes association of the collected data with the personal identifying information of the user. The ODHID is used to associate the collected data, the device ID and the demographic information of the user in a folder of a third database (DB3) accessible to the DCH (10). The third database does not, however, include user identifying information or the user's email address.

At this point, the application operating on the user device collects metrics from the user device and sends them to the DCH (11) with the device ID. When the data points are received by the DCH, the DCH checks the device ID in DB2 and selects the demographic information associated with that device ID. The demographic information is then loaded into DB3 in the folder that is associated with the ODHID that is generated from the device ID. The use of DB2 and DB3 in this way separates the data point's personal identifying information (device ID and email address).

In an embodiment, the application polls the user device for metrics. By way of illustration and not by way of limitation, the user device may be polled at five minute intervals. The application sends the captured metrics to the DCH. In an embodiment, the metrics are sent to the DCH less frequently than the user device is polled, as, for example, every hour.

The DCH tracks the user who is reporting and records the user activity in DB2 in association with the CUID. The PMH uses the activity data to provide reports and analysis regarding the activities of users who have opted in. These data may also be used to provide users the incentives that were promised at the time of registration.

Figure 3:
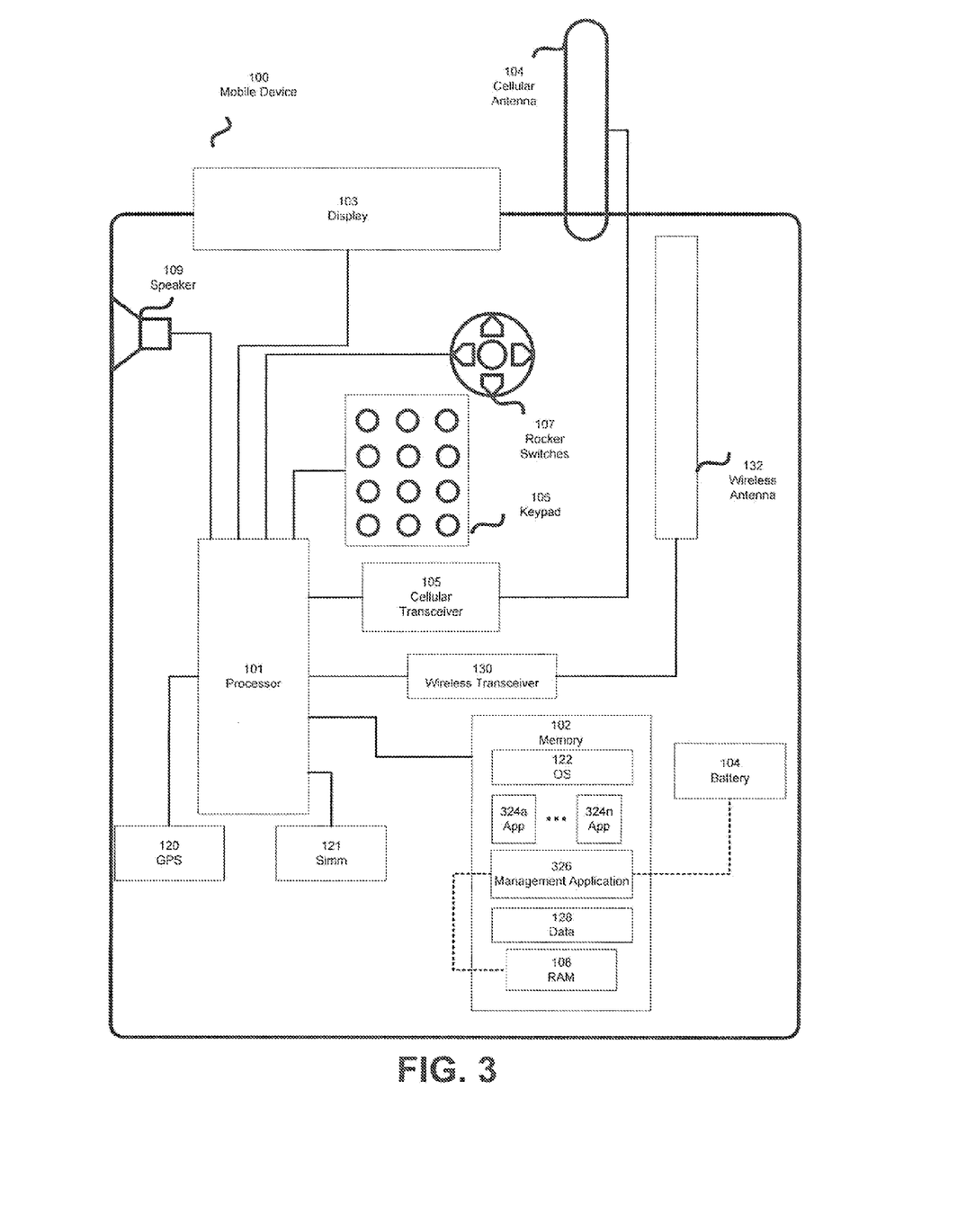
FIG. 3 is a block diagram illustrating a mobile device configured with a user application and a management application according to an embodiment.

FIG. 3 is a block diagram illustrating a mobile device configured with a user application and a management application according to an embodiment.

In this embodiment, the memory 102 comprises user apps (Block 324a through 324n). The management application 326 operates to manage the use of power by the user apps 324. User apps 324 may include browsers, games, location utilities, social networking utilities, time management utilities, email clients, editors, spreadsheets, audio and video rendering utilities and voice recognition applications. By way of illustration and not by way of limitation, the management application 326 may determine that the battery level has reached a threshold value that requires low priority applications that are currently operating to be suspended or exited. In an embodiment, the management application 326 may also block the execution of one or more user apps that are not currently operating until the battery has been recharged to a level that exceeds the threshold level.

Additionally, the management application 326 may be configured to manage the performance of the mobile device 100 by controlling demands of the various applications on the RAM 108 in real-time.

The user apps may be assigned a priority measure that may be used to determine which user apps are candidates for suspension, exiting or blocking. In an embodiment, user apps may be assigned to "sets" of one or more user apps, which sets are assigned a priority measure. When the battery level is equal to or less than a threshold value, the sets of user apps are suspended, exited or blocked in order of their priority measure starting with the lowest priority measure.

By way of illustration and not by way of limitation, a low priority application may be an application that is running in the background and is seldom used, a game application, a music or video rendering application, and an application that is not called by another application. The priority of an application may be configurable through a graphical user interface produced by the management application 326. The management application 326 may utilize multiple battery threshold values to permit the selective shutting down of running applications.

In an embodiment, the priority of an application may be determined on the basis of its use of components of the mobile device 100 that require power from the battery to operate. For example, an application that requires the operation of the cellular transceiver 105, the wireless transceiver 130 or the GPS receiver 120 may be suspended or exited before a program that does not use these elements.

In an embodiment, the priority of an application may be determined by its power demand over time. For example, an application that uses the wireless transceiver 130 to check a stock ticker every hour may use less power per unit of time than an application that checks for e-mail every five minutes.

The selection of applications may also be based on an algorithm that identifies the applications that are currently running and applies one or more of the priority rules described above.

The management application 326 may also be configured to anticipate a need for power and/or RAM (herein, an "event") and to conserve power or memory prior to the event. The management application 326 may be configured to measure a rate of power usage and a current battery level and to determine whether applications need to be suspended or exited to conserve power so as to have sufficient power to support the power event. For example, a calendar program may indicate that a call is scheduled for a time in the future. Alternatively, the management application 326 may identify a power event from historical usage data.

The management application 326 may also be configured to determine a measure of performance of the mobile device and to predict the impact on that performance of the execution of another application.

The power/performance thresholds may, therefore, be established dynamically.

Figure 4A:
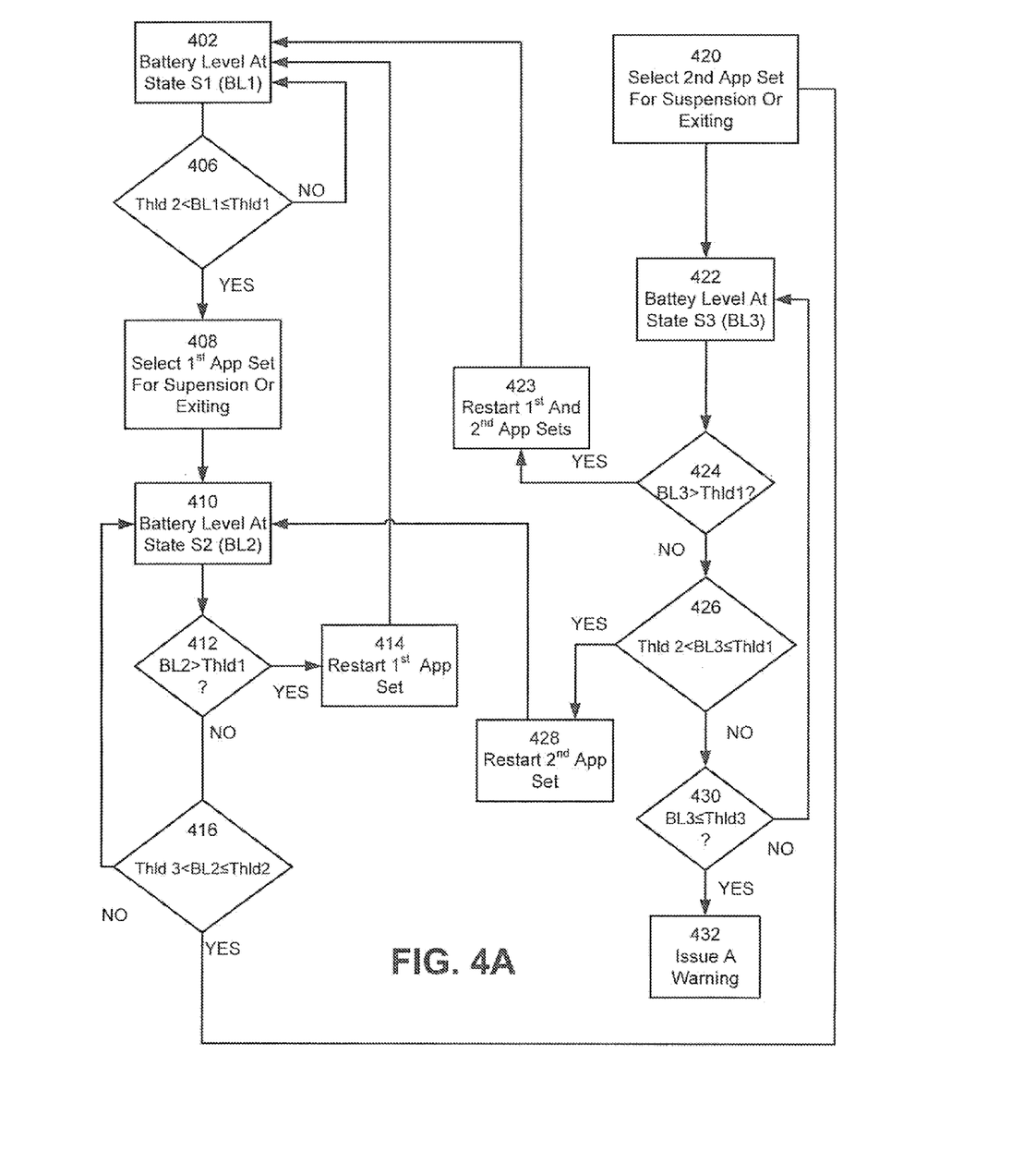
FIG. 4 is a block diagram illustrating the flow of battery management operations according to an embodiment.

FIG. 4A is a block diagram illustrating the flow of battery management operations according to an embodiment.

The current status (S1) of the battery is obtained (Block 402). A determination is made whether the battery level at state S1 is less than or equal to a first threshold level and greater than a second threshold level (Block 406). If the battery level at state S1 is not less than or equal to a first threshold level and greater than a second threshold level, that is, if the result of Block 406 is "NO," the current battery status is obtained (Block 402) at state S1. If the battery level is less than or equal to a first threshold level and greater than a second threshold level, that is, if the result of Block 406 is "YES," a first set of applications is selected for suspension or exiting (Block 408). After the suspension or exiting of the first set of applications, the mobile device 100 is in a second state (state S2).

The selection of applications for suspension or exiting may be made on the basis of a priority assigned to an application as described above.

A current status of the battery at state S2 is obtained (Block 410). The battery status may have changed, for example, because the mobile device 100 may be in use or it may have been connected to an external power supply. A determination is made whether the battery level is greater than the first threshold level (Block 412). If the battery level is greater than the first threshold, that is, if the result of Block 412 is "YES," the first set of applications selected for suspension or exiting may be restarted (Block 414) and the operation returns to obtaining the current status of the battery at Block 402 at state S1. If the battery level is below a first threshold, that is, if the result of Block 412 is "NO," a determination is made whether the battery level is less than or equal to the second threshold level and greater than a third threshold level(Block 416).

If the battery level is not less than or equal to the second threshold level and greater than a third threshold level, that is, if the result of Block 416 is "NO," the current battery status is obtained (Block 410) at state S2. If the battery level is less than or equal to the second threshold level and greater than a third threshold level, that is, if the result of Block 416 is "YES," a second set of applications is selected for suspension or exiting (Block 420). After the suspension or exiting of the second set of applications, the mobile device 100 is in a third state (state S3).

A current status of the battery at state S3 is obtained (Block 422). A determination is made whether the battery level at state S3 is greater than the first threshold (Block 424). If the battery level greater than the first threshold, that is, if the result of Block 424 is "YES," the first and second sets of applications selected for suspension or exiting may be restarted (Block 423) and the operation returns to obtaining the current status of the battery at Block 402 at state S1. If the battery level is greater than the second threshold level and less than or equal to the first threshold level, that is, if the result of Block 426 is "YES," the second set of applications selected for suspension or exiting may be restarted (Block 428) and the operation returns to obtaining the current status of the battery at Block 410 at state S2.

If the battery level is not greater than the second threshold level and less than or equal to the first threshold level, that is, if the result of Block 426 is "NO," a determination is made whether the battery level is less than or equal to a third threshold (Block 430). If the battery level is not below a third threshold, that is, if the result of Block 430 is "NO," the operation returns to obtaining the current status of the battery at Block 422 at state S3. If the battery level is equal to or less than a third threshold, that is, if the result of Block 430 is "YES," a warning may be issued that the power level of the battery is below a level that cannot be managed without user intervention (Block 432).

While only three threshold levels are illustrated in FIG. 4A, the number of thresholds may exceed three. For example, in an embodiment the number of thresholds is user selectable from 1 to 20 thresholds.

Figure 4B:
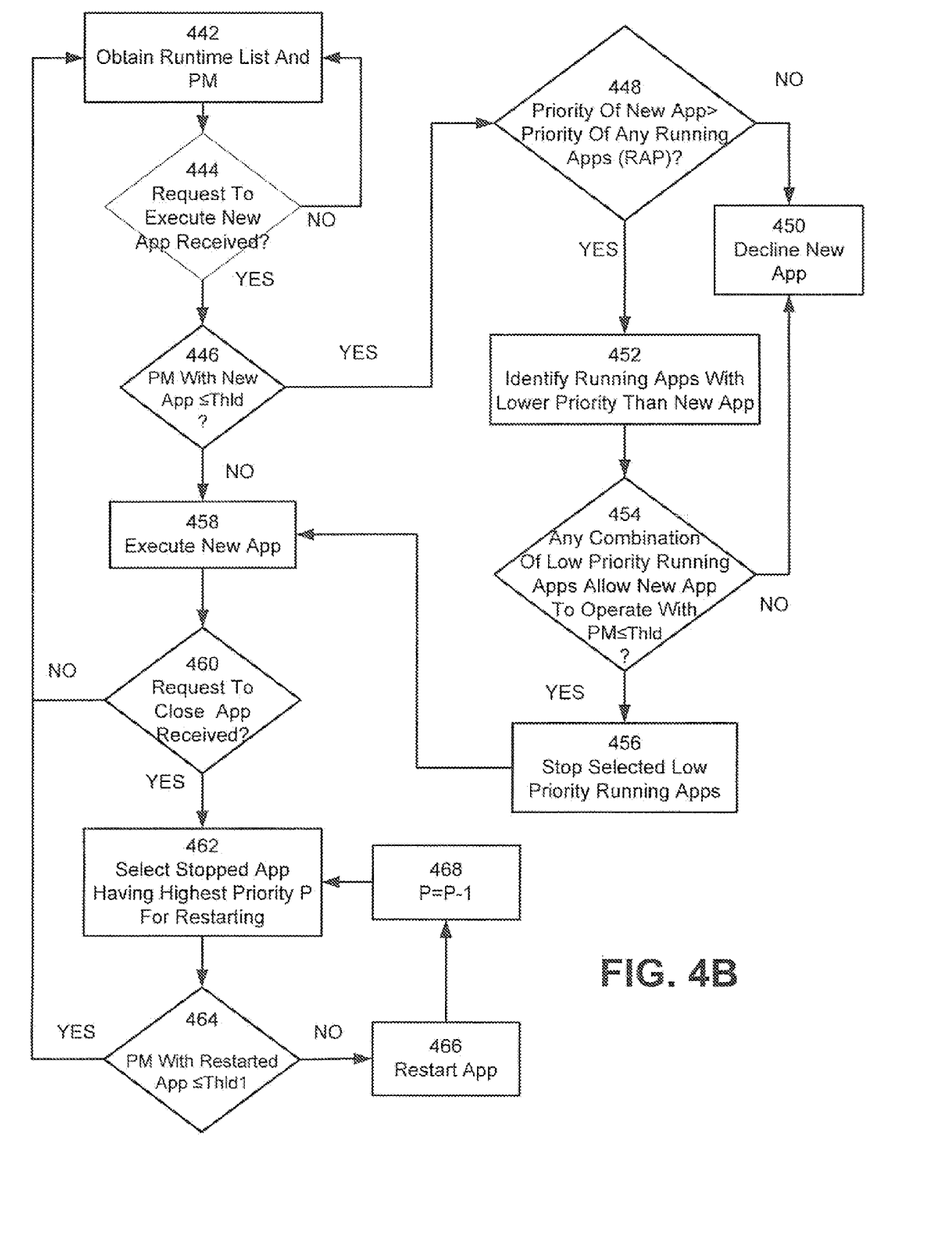

The management application 326 may also be configured to maintain a performance level for the mobile device by managing the demands on RAM 108. FIG. 4B is a block diagram illustrating the flow of performance management operations according to an embodiment.

The current runtime list and a measure of performance of the mobile device are obtained (Block 442). In an embodiment, the runtime list includes applications that are using the RAM. A measure of performance may be expressed as a speed of execution of a program or a computation. In still another embodiment, the memory management application runs a test script to determine a current measure of performance.

A request to open a new application is received. (Block 444.) The memory requirements and the impact of performance of the new application on RAM are either estimated or known. A determination is made whether the execution of the new application will cause a projected measure of performance to be equal to or less than a threshold value. (Block 446.) If the execution of the new application will not cause the projected measure of performance to be equal to or less than a threshold value, that is if the result of Block 446 is "NO," the new application may be executed. (Block 458.) If the execution of the new application will cause the projected measure of performance to be equal to or less than a threshold value, that is if the result of Block 446 is "YES," a determination is made whether the priority of the new application is greater than the priority of any of the running applications. (Block 448.)

If the priority of the new application is not greater than the priority of any of the running applications, that is if the result of Block 448 is "NO," the operation of the new application is declined. In an embodiment, the memory management application may cause a message to appear on the screen of the mobile device explaining why executing the new application was declined and giving the user the opportunity to override the memory management application.

If the priority of the new application is greater than the priority of at least one of the running applications, that is if the result of Block 448 is "YES," then running applications having a lower priority than the new application are identified. (Block 452.)

A determination is made whether stopping any combination of lower priority running applications would allow the new application to run with a projected performance measure that is greater than the threshold. (Block 454.) If stopping any combination of lower priority running applications would not allow the new application to run with a projected performance measure that is greater than the threshold, that is if the result of Block 454 is "NO," the operation of the new application is declined. (Block 450.) In an embodiment, the memory management application may cause a message to appear on the screen of the mobile device explaining why executing the new application was declined and giving the user the opportunity to override the memory management application.

If stopping any combination of lower priority running applications would allow the new application to run with a projected performance measure that is greater than the threshold, that is if the result of Block 454 is "YES," the selected low priority running applications are stopped. (Block 456.) The new application is executed. (Block 458.) The selection of low priority running applications for stoppage may be made based on the priority of each such application and/or the contribution to the performance measure that stopping a particular application would make.

After the new application is executed (Block 458), a determination may be made whether a request to close any of the running applications (including the new application) has been received. (Block 460.) If a request to close any of the running applications (including the new application) has not been received, that is, if the result of Block 460 is "NO," the process returns to Block 442. If a request to close any of the running applications (including the new application) has been received, that is if the result of Block 460 is "YES," a stopped application (see Block 456) with the highest priority "P" is selected for restarting. (Block 462.)

A determination is made whether the restarting of the selected stopped application will cause a projected measure of performance to be equal to or less than a threshold value. (Block 464.) If the restarting of the stopped application will cause the projected measure of performance to be equal to or less than a threshold value, that is if the result of Block 464 is "YES," the stopped application is not restarted and the process returns to Block 442. If the restarting of the stopped application will not cause the projected measure of performance to be equal to or less than a threshold value, that is if the result of Block 464 is "NO," the stopped application with the priority P is restarted. (Block 466.) The value P is decremented by one (Block 468) and the next highest priority stopped application is evaluated for restarting (Block 462).

FIG. 5 is a block diagram of a computing device suitable for use with any of the embodiments.

As previously described, the subscriber may interact with the various servers and network components using a variety of the computing devices, including, for example, the mobile device 100.

The various embodiments may also be implemented on any of a variety of commercially available server devices, such as the server 1100 illustrated in FIG. 5. Such a server 1100 typically includes a processor 1101, for execution of the visibility rules or the performance of the tasks of an email server, coupled to volatile memory 1102 and a large capacity nonvolatile memory, such as a disk drive 1103. The server 1100 may also include a floppy disc drive, compact disc (CD) or DVD disc drive 1104 coupled to the processor 1101. The server 1100 may also include network access ports 1106 coupled to the processor 1101 for establishing data connections with a network 1112, such as a local area network coupled to other broadcast system computers and servers. Server 1100 may also include operator interfaces, such as a keyboard 1108, pointer device (e.g., a computer mouse 1110), and a display 1109.

The processor 1101 may be any programmable microprocessor, microcomputer or multiple processor chip or chips that can be configured by software instructions (applications) to perform a variety of functions, including the functions of the visibility rules as illustrated in various embodiments described above.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. Non-transitory computer-readable or processor-readable media include both computer storage media and tangible storage media that facilitate transfer of a computer program from one place to another. Non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A system comprising:
    a mobile device comprising:
        a mobile device processor configured with processor-executable instructions to perform operations comprising monitoring the mobile device to collect data from the mobile device;
    a first host device comprising:
        a first datastore;
        a first memory; and
        a first processor coupled to the first memory; and
    a second host device comprising:
        a second datastore;
        a second memory; and
        a second processor coupled to the second memory, the second datastore, and a third datastore,
    wherein the first processor is configured with processor-executable instructions to perform operations comprising:
        receiving personal identifying information of a user of the mobile device and demographic information of the user of the mobile device; and
        storing in the first datastore the personal identifying information and the demographic information in association with a unique identifier that does not disclose the personal identifying information, and
    wherein the second processor is configured with processor-executable instructions to perform operations comprising:
        receiving the demographic information in association with the unique identifier from the first datastore;
        receiving a mobile device identifier of the mobile device;
        storing in the second datastore the mobile device identifier in association with the unique identifier;
        receiving the data collected from the mobile device and a device identifier;
        determining whether the received device identifier matches the mobile device identifier stored in the second datastore;
        double hashing the received device identifier to generate an obfuscated double hash identifier (ODHID) in response to determining that the received device identifier matches the mobile device identifier stored in the second datastore; and
        storing in the third datastore the received demographic information and the received data in a folder associated with the ODHID.

2. The system of claim 1, wherein the second processor is configured with processor-executable instructions to perform operations such that receiving data collected from the mobile device comprises receiving data at pre-determined intervals.

3. The system of claim 1, wherein the second processor is configured with processor-executable instructions to perform operations further comprising:
    updating a count in the second datastore associated with the unique identifier so that the count is indicative of a cumulative amount of data reported by the mobile device.

4. The system of claim 3, wherein the second processor is configured with processor-executable instructions to perform operations further comprising selecting a reward for the user of the mobile device based on the count.

5. The system of claim 1, wherein the mobile device is selected from the group consisting of a smartphone and a tablet.

6. The system of claim 1, wherein the mobile device processor is configured with processor-executable instructions to perform operations such that monitoring the mobile device to collect data from the mobile device comprises collecting device parameters that include one of:
    an operating system parameter;
    a date and time of a monitored event;
    an Internet protocol (IP) address of the mobile device;
    the mobile device identifier;
    a status of the mobile device; and
    an event identifier.

7. The system of claim 1, wherein the mobile device processor is configured with processor-executable instructions to perform operations such that monitoring the mobile device to collect data from the mobile device comprises collecting the data in response to detecting one of:
- an activation of a Bluetooth transceiver;
- a deactivation of the Bluetooth transceiver;
- an activation of a Wi-Fi transceiver;
- a deactivation of the Wi-Fi transceiver,
- an activation of a global positioning system (GPS) received;
- a deactivation of the GPS receiver;
- a switch from a Wi-Fi connection to a cellular connection;
- an application call operation;
- a web page access operation;
- a power on operation;
- a power off operation;
and
- a telephone call operation.

8. The system of claim 1, wherein the mobile device processor is configured with processor-executable instructions to perform operations such that monitoring the mobile device to collect data from the mobile device comprises collecting network data parameters that include one of:
- a network quality measure;
- network type identifier;
- a measure of data consumed;
- a session time; and
- an application type.

9. The system of claim 1, wherein the mobile device processor is configured with processor-executable instructions to perform operations such that monitoring the mobile device to collect data from the mobile device comprises collecting location parameters that include one of:
- global positioning system (GPS) data;
- a base station identifier; and
- a sector identifier.

10. A method for anonymously collecting data from a mobile device, the method comprising:
- monitoring mobile device operations in a processor of the mobile device to collect data from the mobile device;
- receiving at a first host device personal identifying information of a user of the mobile device and demographic information of the user of the mobile device;
- storing in a first datastore of the first host device the personal identifying information and the demographic information in association with a unique identifier that does not disclose the personal identifying information;
- receiving in a second host device the demographic information in association with the unique identifier from the first datastore;
- receiving in the second host device a mobile device identifier of the mobile device;
- storing in a second datastore of the second host device the mobile device identifier in association with the unique identifier;
- receiving the data collected from the mobile device and a device identifier;
- determining whether the received device identifier matches the mobile device identifier stored in the second datastore;
- double hashing by the second host the device identifier to generate an obfuscated double hash identifier (ODHID) in response to determining that the received device identifier matches the mobile device identifier stored in the second datastore;
and
- storing in a third datastore of the second host the demographic information and collected data in a folder associated with the ODHID.

11. The method of claim 10, wherein receiving in the second host device the data collected from the mobile device comprises receiving data at pre-determined intervals.

12. The method of claim 10 further comprising:
- updating a count in the second datastore associated with the unique identifier so that the count is indicative of a cumulative amount of data reported by the mobile device.

13. The method of claim 12 further comprising;
- selecting a reward for the user of the mobile device based on the count.

14. The method of claim 10, wherein the mobile device is selected from the group consisting of a smartphone and a tablet.

15. The method of claim 10, wherein monitoring mobile device operations to collect data from the mobile device comprises collecting device parameters that include one of:
- an operating system parameter;
- a date and time of a monitored event;
- an Internet protocol (IP) address of the mobile device;
- the mobile device identifier;
- a status of the mobile device; and
- an event identifier.

16. The method of claim 10, wherein monitoring mobile device operations to collect data from the mobile device comprises collecting the data in response to detecting one of:
- an activation of a Bluetooth transceiver;
- a deactivation of the Bluetooth transceiver;
- an activation of a Wi-Fi transceiver;
- a deactivation of the Wi-Fi transceiver;
- an activation of a global positioning system (GPS) receiver;
- a deactivation of the GPS receiver;
- a switch from a Wi-Fi connection to a cellular connection;
- an application call operation;
- to a web page access operation;
- a power on operation;
- a power off operation;
and
- a telephone call operation.

17. The method of claim 10, wherein monitoring mobile device operations to collect data from the mobile device comprises collecting network data parameters that include one of:
- a network quality measure;
- network type identifier;
- a measure of data consumed;
- a session time; and
- an application type.

18. The method of claim 10, wherein monitoring mobile device operations to collect data from the mobile device comprises collecting location parameters that include one of:
- global positioning system (GPS) data;
- a base station identifier; and
- a sector identifier.

19. A method for anonymously collecting data from a mobile device, the method comprising:
- monitoring mobile device operations in a processor of the mobile device to collect data from the mobile device;
- receiving in a first host device personal identifying information of a user of the mobile device and demographic information of the user of the mobile device;
- storing in a first datastore of the first host device the personal identifying information and the demographic information in association with a unique identifier that does not disclose the personal identifying information;

receiving in a second host device the demographic information in association with the unique identifier from the first datastore;

receiving in the second host device a mobile device identifier of the mobile device;

storing in a second datastore of the second host device the mobile device identifier in association with the unique identifier;

double hashing by the second host the device identifier to generate an obfuscated double hash identifier (ODHID);

receiving in the second host device the data collected from the mobile device and the device identifier;

storing in a third datastore at the second host the demographic information and collected data in a folder associated with the ODHID;

monitoring an amount of data reported by the mobile device in the second host device;

updating a count in the second datastore associated with the unique identifier so that the count is indicative of a cumulative amount of the data reported by the mobile device; and selecting a reward for the user based on the count.

20. The method of claim 19, wherein receiving at the second host data collected from the mobile device comprises receiving data at pre-determined intervals.

21. The method of claim 19, further comprising determining whether the received device identifier matches the mobile device identifier stored in the second datastore, wherein double hashing the device identifier to generate the ODHID comprises generating the ODHID in response to determining that the received device identifier matches the mobile device identifier stored in the second datastore.

22. The method of claim 19, wherein the mobile device is selected from the group consisting of a smartphone and a tablet.

23. The method of claim 19, wherein monitoring mobile device operations to collect data from the mobile device comprises collecting device parameters that include one of:
an operating system parameter;
a date and time of a monitored event;
an Internet protocol (IP) address of the mobile device;
the mobile device identifier;
a status of the mobile device; and
an event identifier.

24. The method of claim 19, wherein monitoring mobile device operations to collect data from the mobile device comprises collecting the data in response to detecting one of:
an activation of a Bluetooth transceiver;
a deactivation of the Bluetooth transceiver;
an activation of a Wi-Fi transceiver;
a deactivation of the Wi-Fi transceiver;
an activation of a global positioning system (GPS) receiver;
a deactivation of the GPS receiver;
a switch from a Wi-Fi connection to a cellular connection;
an application call operation;
a web page access operation;
a power on operation;
a power off operation; and
a telephone call operation.

25. The method of claim 19, wherein monitoring mobile device operations to collect data from the mobile device comprises collecting network data parameters that include one of:
a network quality measure;
network type identifier;
a measure of data consumed;
a session time; and
an application type.

26. The method of claim 19, wherein monitoring mobile device operations to collect data from the mobile device comprises collecting location parameters that include one of:
global positioning system (GPS) data;
a base station identifier; and
a sector identifier.

27. A system, comprising:
a mobile device comprising a mobile device processor configured with processor-executable instructions to perform operations comprising monitoring the mobile device to collect data from the mobile device;
a first host device comprising:
a first datastore;
a first memory; and
a first processor coupled to the first memory;
a second host device comprising:
a second datastore;
a third datastore;
a second memory; and
a second processor coupled to the second datastore, the third datastore, and the second memory,
wherein the first processor is configured with processor-executable instructions to perform operations comprising:
receiving personal identifying information of a user of the mobile device and demographic information of the user of the mobile device;
storing in the first datastore the personal identifying information and the demographic information in association with a unique identifier that does not disclose the personal identifying information;
wherein the second processor is configured with processor-executable instructions to perform operations comprising:
receiving the demographic information in association with the unique identifier from the first datastore;
receiving a mobile device identifier of the mobile device;
storing in a second datastore the mobile device identifier in association with the unique identifier;
double hashing the device identifier to generate an obfuscated double hash identifier (ODHID);
receiving the data collected from the mobile device and the device identifier;
storing in a third datastore the demographic information and collected data in a folder associated with the ODHID;
monitoring an amount of data reported by the mobile device;
updating a count in the second datastore associated with the unique identifier so that the count is indicative of a cumulative amount of the data reported by the mobile device; and
selecting a reward for the user based on the count.

28. The method of claim 27, wherein the second processor is configured with processor-executable instructions to perform operations such that receiving at the second host data collected from the mobile device comprises receiving data at pre-determined intervals.

29. The method of claim 27, wherein the second processor is configured with processor-executable instructions to perform operations further comprising determining whether the received device identifier matches the mobile device identifier stored in the second datastore, and wherein second processor is configured with processor-executable instructions to perform operations such that double hashing the device identifier to generate the ODHID comprises generating the ODHID in response to determining that the received device identifier matches the mobile device identifier stored in the second datastore.

30. The method of claim 27, wherein the mobile device is selected from the group consisting of a smartphone and a tablet.

31. The method of claim 27, wherein the mobile device processor is configured with processor-executable instructions to perform operations such that monitoring mobile device operations to collect data from the mobile device comprises collecting device parameters that include one of:
- an operating system parameter;
- a date and time of a monitored event;
- an Internet protocol (IP) address of the mobile device;
- the mobile device identifier;
- a status of the mobile device; and
- an event identifier.

32. The method of claim 27, wherein the mobile device processor is configured with processor-executable instructions to perform operations such that monitoring mobile device operations to collect data from the mobile device comprises collecting the data in response to detecting one of:
- an activation of a Bluetooth transceiver;
- a deactivation of the Bluetooth transceiver;
- an activation of a Wi-Fi transceiver;
- a deactivation of the Wi-Fi transceiver;
- an activation of a global positioning system (GPS) receiver;
- a deactivation of the GPS receiver;
- a switch from a Wi-Fi connection to a cellular connection;
- an application call operation;
- a web page access operation;
- a power on operation;
- a power off operation; and
- a telephone call operation.

33. The method of claim 27, wherein the mobile device processor is configured with processor-executable instructions to perform operations such that monitoring mobile device operations to collect data from the mobile device comprises collecting network data parameters that include one of:
- a network quality measure;
- network type identifier;
- a measure of data consumed;
- a session time; and
- an application type.

34. The method of claim 27, wherein the mobile device processor is configured with processor-executable instructions to perform operations such that monitoring mobile device operations to collect data from the mobile device comprises collecting location parameters that include one of:
- global positioning system (GPS) data;
- a base station identifier; and
- a sector identifier.

* * * * *